Jan. 7, 1958   C. V. BLIVEN   2,818,942
SHOCK ABSORBER
Filed March 23, 1956

C. V. BLIVEN
INVENTOR.
BY E. C. McRae
J. R. Faulkner
J. H. Oster
ATTORNEYS

United States Patent Office

2,818,942
Patented Jan. 7, 1958

2,818,942

SHOCK ABSORBER

Charles V. Bliven, Belleville, Mich., assignor to Ford Motor Company, Dearborn, Mich., a corporation of Delaware Application March 23, 1956, Serial No. 573,516

1 Claim. (Cl. 188—88)

This invention relates generally to shock absorbers, and particularly to tubular type hydraulic shock absorbers for motor vehicles.

An object of the present invention is to provide a shock absorber for a motor vehicle having a simplified piston and valve construction providing the proper control in jounce and rebound, and providing an easily and economically manufactured unit. In an embodiment of the invention the piston is provided with a single central opening therein forming the sole path of fluid communication through the piston between the portions of the cylinder on opposite sides of the piston. A single double acting valve unit is mounted upon the piston and controls the flow of fluid through the central piston opening in both directions, and eliminates the requirement for auxiliary passageways, valves, etc. The piston may be formed as a one-piece unit having an annular peripheral groove carrying a resilient sealing ring, or it may be in the form of a two part piston having an annular space between the parts of the piston for a sealing ring.

Another object of the invention is to provide a shock absorber construction of the type mentioned above which is adaptable to the conventional type of shock absorber in which the unit performs only shock absorbing functions, and also to the combined hydraulic shock absorber and telescopic control member type which is constructed and designed to assist the suspension in supporting and guiding the road wheel during its rising and falling movements relative to the sprung structure of the vehicle.

Other objects and advantages of this invention will be made more apparent as this description proceeds, particularly when considered in connection with the accompanying drawings, wherein.

Figures 1, 2:
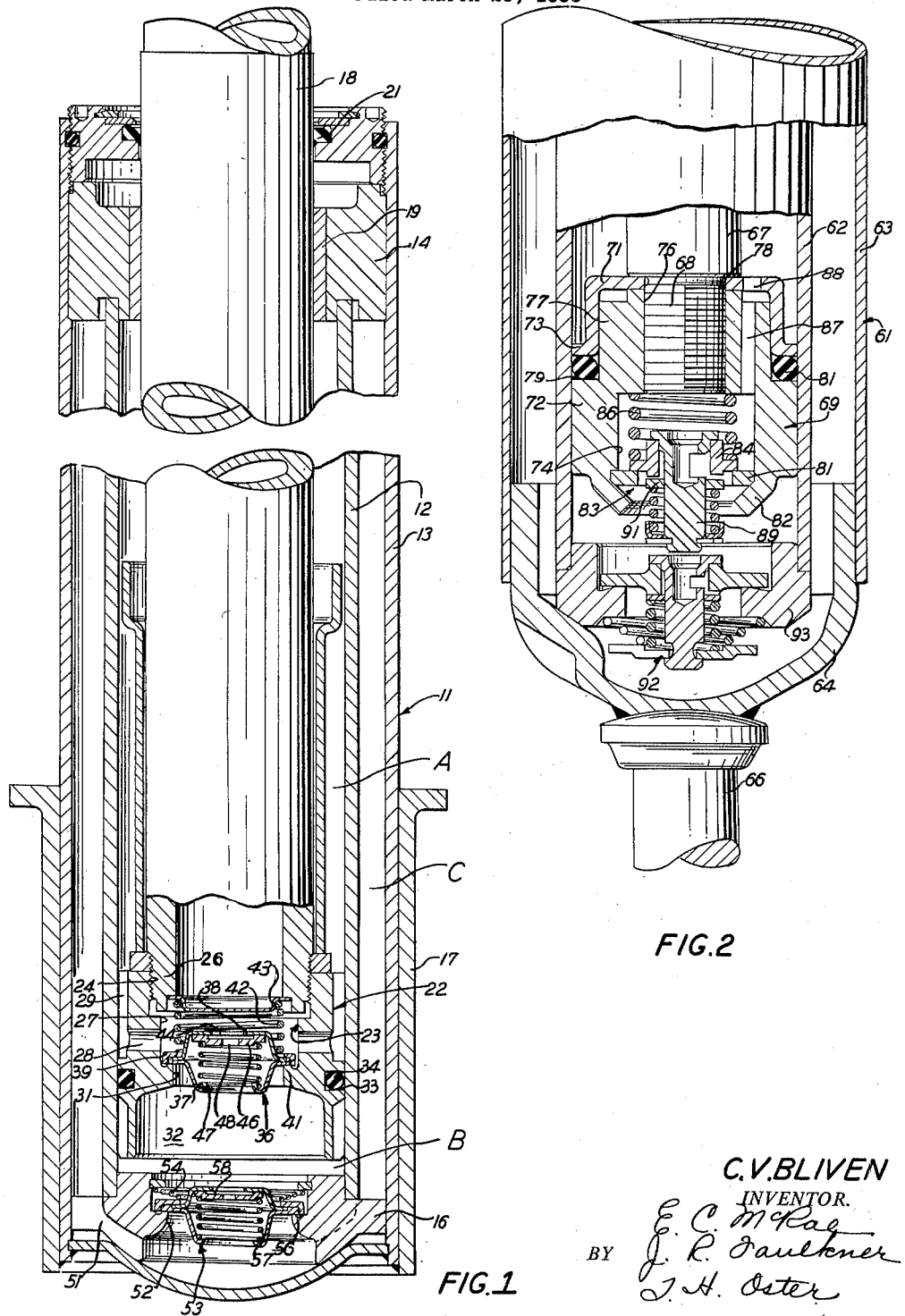
Figure 1 is a vertical cross sectional view through a shock absorber incorporating the present invention.
Figure 2 is a vertical cross sectional view through a shock absorber incorporating a modification.

Referring now to the drawings, and particularly to Figure 1, the reference character 11 indicates generally a combined hydraulic shock absorber and tubular control unit forming part of a vehicle suspension unit. Inner and outer concentric cylinders 12 and 13 are provided, being inter-connected at their upper and lower ends respectively by end caps 14 and 16. A flanged sleeve 17 surrounds the lower end of the outer cylinder 13, being welded thereto, and provides means for mounting the assembly upon a wheel spindle (not shown) which in turn supports the adjacent road wheel.

A tubular piston rod 18 is reciprocably mounted within the unit, slidably engaging a bearing 19 carried by the upper end cap 14, and cooperating with a sealing member 21 to form a seal at the upper end of the unit. At its lower end the piston rod 18 carries a piston 22 slidably received within the inner cylinder 12 and forming an additional bearing providing the required resistance to the bending stresses induced in the unit during operation.

The piston 22 is formed with a centrally located stepped bore 23 extending completely through the piston and forming the sole fluid path therebetween. The enlarged upper end 24 of the bore 23 of the piston is internally threaded to threadedly engage the externally threaded lower end portion 26 of the tubular piston rod for connection thereto. The intermediate portion 27 of the bore 23 of the piston provides a central chamber communicating with radially extending passageways 28 in turn communicating with axially extending grooves 29 formed on the periphery of the piston 22 to provide a fluid path between the central opening in the piston and the annular chamber A between the tubular piston rod 18 and the inner cylinder 12 above the piston 22. The smaller lower portion 31 of the bore 23 in the piston communicates with an enlarged chamber 32 in the lower portion of the piston and with the chamber B in the lower portion of the inner cylinder 12 beneath the piston 22.

The periphery of the piston 22 is formed with an annular groove 33 in which is seated a resilient sealing ring 34 engaging the inner surface of the inner cylinder 12 to form a seal therewith.

A single double acting control valve 36 is carried by the piston 22 for controlling the flow of fluid in both directions through the central opening 23 in the piston, and consequently between the chambers A and B on opposite sides of the piston. The valve 36 is formed by a pair of opposed cup shaped sheet metal members 37 and 38 having adjacent peripheral flanges. The periphery of the flange of the lower member 37 is threaded for engagement by a threaded ring 39 clamping the members 37 and 38 together to form a unit. If desired, of course, the separate attaching ring can be eliminated by spinning over the peripheral flange of one of the cup shaped members over the adjacent flange of the other member.

The valve unit 36 engages a valve seat 41 formed in the piston at the juncture between the portions 27 and 31 of the central bore through the piston, being held against this seat by means of a coil spring 42 having its opposite end engaging a retainer 43 carried by the lower end of the tubular piston rod 18 and closing the central opening therein.

The upper cup shaped member 38 of the valve unit is formed with a central port 44 adapted to be controlled by a valve disc 46 held against the upper wall of the member 38 by means of a coil spring 47 having its lower portion seated upon the lower wall of the lower cup shaped member 37 of the valve unit. The valve disc 47 is formed with a central restricted opening 48 therein.

The lower end cap 16 of the shock absorber is formed with passageways 51 establishing communication between the central opening 52 in the end cap and the annular reservoir chamber C between the inner and outer cylinders 12 and 13. A double acting valve unit 53 similar in construction to the valve unit 36 is mounted in the end cap 16 to control the flow of fluid through the central opening 52 therein in opposite directions. A light spring 54 holds the valve unit 53 against its seat 56, and a second coil spring 57 holds the apertured valve disc 58 against the upper wall of the valve member 53.

In operation, during jounce the piston rod 18 and the piston 22 carried thereby move downwardly within the inner cylinder 12, compressing fluid in the chamber B in the lower portion of the inner cylinder 12. The valve 36 carried by the piston is raised from its seat 41 against the action of coil spring 42 to permit a flow of fluid through the bore 23 in the piston and the passageways 28 and 29 into the annular chamber A between the piston rod 18 and the inner cylinder 12. Differential fluid is forced past the valve disc 58 in the lower valve unit 53 and through the passageways 51 into the reservoir chamber C. During rebound, in which the piston rod 18 and piston 22 move upwardly within the inner cylinder 12, fluid in chamber A is compressed and forced through the restricted opening 48 in the valve disc 46. If necessary, the valve disc 46 unseats against the action of coil spring 47 to enable additional fluid to pass through the port 44 in the upper cup shaped member 38 of the valve unit 36. Replenishing fluid also flows from the reservoir C past the valve 53 in the end member 16 of the shock absorber by lifting the valve member from its seat 56 to permit the fluid to enter the lower chamber B in the inner cylinder 12.

Referring now to the modification of the invention shown in Figure 2, the reference character 61 indicates generally a tubular type shock absorber adapted to be mounted between sprung and unsprung members of a vehicle wheel suspension to perform shock absorbing functions alone. The inner and outer cylinders 62 and 63 of the shock absorber are interconnected by an end member 64 having a stem 66 for connection to the unsprung portion of the vehicle. A piston rod 67 having a threaded lower end portion 68 is connected at its upper end to the sprung portion of the vehicle and at its lower end carries a piston assembly 69. The piston assembly 69 is formed of upper and lower sections 71 and 72 respectively. The upper portion 71 of the piston is in the form of a sheet metal cup shaped member adapted to be sleeved over the threaded shank 68 of the piston rod and having a lower flange 73. The lower portion 72 of the piston assembly has a central opening 74 extending completely therethrough and having an upper reduced portion 76 internally threaded for engagement with the threaded end 68 of the piston rod 67. The upper portion 77 of the lower part 72 of the piston assembly slides within the central portion of the upper part 71 and clamps the latter to the shoulder 78 formed between the threaded lower end portion 68 of the piston rod and the intermediate portion thereof. In the assembled position of the two piston parts, an annular groove 79 is formed therebetween and receives a sealing ring 81 engageable with the annular surface of the inner cylinder 62.

An annular valve disc 81 is sleeved within the central bore 74 of the piston 69 and held therein by spinning over the lower flange 82 of the piston. A double acting valve unit 83 is carried by the valve disc 81 on the piston 69 and is formed with a flanged sleeve 84 held in seating engagement with the valve disc 81 by means of the spring 86 to control the flow of fluid from the lower portion of the inner cylinder 62 through the bore 74 in the piston and the passageways 87 and 88 in the piston parts 72 and 71 respectively to the upper portion of the inner cylinder 62. Flow in the opposite direction is controlled by a ported valve stem 89 and a spring urged valve disc 91. A similar double acting valve unit 92 is carried by a member 93 mounted in the lower portion of the inner cylinder 62 to control the flow of fluid between the inner cylinder 62 and the annular reservoir formed between the inner and outer cylinder 62 and 63 respectively.

It will be understood that the invention is not to be limited to the exact construction shown and described, but that various changes and modifications may be made without departing from the spirit and scope of the invention, as defined in the appended claim.

What is claimed is:

In a shock absorber for a motor vehicle having sprung and unsprung members, a pair of concentric cylinders of different diameters connected to each other and to one of said members and forming an annular reservoir chamber therebetween, an end member interconnecting adjacent ends of said cylinders, valve means carried by said end member controlling the flow of fluid between said reservoir chamber and the inner of said pair of cylinders, a piston rod connected to the other of said first mentioned members and extending into said inner cylinder, a piston mounted upon the inner end of said piston rod, said piston having a single central opening therein forming the sole path of fluid communication through said piston between the portions of said inner cylinder on opposite sides of said piston, said piston opening being in the form of a stepped bore with the larger diameter portion of said bore being remote from the piston rod end of said piston, a flat valve seat between the stepped portions of said bore facing the piston rod end of said piston, a pair of opposed cup shaped valve elements having juxtaposed peripheral flanges secured together to form a hollow generally cylindrical housing, spring means urging the peripheral flange of said housing into seating engagement with said flat valve seat to control the flow of fluid through said piston opening in one direction, said housing having axially aligned openings in its opposite ends walls, a flat valve disc within said housing adapted to cover the opening in the end wall of said housing adjacent the piston rod end of said piston to control the flow of fluid through said piston opening in the opposite direction, and a coil spring within said housing urging said disc valve towards its seated position.

References Cited in the file of this patent

UNITED STATES PATENTS

| 2,263,284 | Beecher | Nov. 28, 1941 |
| 2,481,088 | Cuskie | Sept. 6, 1949 |
| 2,538,375 | Montgomery | Jan. 16, 1951 |

FOREIGN PATENTS

| 877,559 | Germany | Dec. 14, 1953 |
| 1,064,843 | France | Dec. 30, 1953 |